(12) United States Patent
Minoshima et al.

(10) Patent No.: US 6,351,053 B1
(45) Date of Patent: *Feb. 26, 2002

(54) RELUCTANCE MOTORS

(75) Inventors: Norimoto Minoshima; Yasuharu Odachi, both of Kariya (JP)

(73) Assignee: Kabushiki Kaisha Toyoda Jidoshokki Seisakusho, Kariya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/159,933

(22) Filed: Sep. 24, 1998

(30) Foreign Application Priority Data

Oct. 1, 1997 (JP) .............................. 9-268828

(51) Int. Cl.$^7$ .......................... H02K 1/00; H02K 17/42; H02K 1/22; H02K 23/00; H02P 1/46
(52) U.S. Cl. ...................... 310/216; 310/168; 310/262; 310/269; 318/254; 318/701
(58) Field of Search ................. 310/216, 254, 310/258, 259, 261, 184, 185, 186, 187, 179, 168, 49 R, 171, 166, 262, 269; 318/254, 701

(56) References Cited

U.S. PATENT DOCUMENTS

| | | | | |
|---|---|---|---|---|
| 5,148,090 A | * | 9/1992 | Oku et al. .................. | 318/107 |
| 5,304,882 A | * | 4/1994 | Lipo et al. ................. | 310/156 |
| 5,459,385 A | * | 10/1995 | Lipo et al. ................. | 318/701 |
| 5,517,102 A | * | 5/1996 | Jensen ........................ | 318/701 |
| 5,825,112 A | * | 10/1998 | Lipo et al. ................. | 310/181 |
| 5,825,113 A | * | 10/1998 | Lipo et al. ................. | 310/181 |
| 5,828,152 A | * | 10/1998 | Takeda et al. .............. | 310/156 |
| 5,844,343 A | * | 12/1998 | Horst ......................... | 310/184 |

FOREIGN PATENT DOCUMENTS

| | | |
|---|---|---|
| EP | 0 625 819 A1 | 10/1987 |
| EP | 0 301 036 B1 | 5/1990 |
| JP | 8126273 | 5/1996 |
| JP | 8322171 | 12/1996 |

OTHER PUBLICATIONS

Article by T.J.E. Miller, entitled "Brushless Permanent–Magnet and Reluctance Motor Drives", published by Clarendon Press, Oxford, 1989.

"Brushless Permanent–Magnet and Reluctance Motor Drives", T.J.E. Miller, Clarendon Press 1989, pp. 158–191.

* cited by examiner

Primary Examiner—Nestor Ramirez
Assistant Examiner—Dang Dinh Le
(74) Attorney, Agent, or Firm—Morgan & Finnegan, LLP

(57) ABSTRACT

A reluctance motor is described in which stator coils are driven with sinusoidal, or substantially sinusoidal, waveforms. Preferably, the spread angle of the stator poles is less that the spread angle of the rotor poles. More preferably, the spread angles of the stator poles $\theta S$ and the rotor poles $\theta r$ are set such that $\theta S$ is approximately equal to $2\pi/(m \cdot Nr)$ and $\theta r$ is about $(\theta S + \pi/Nr)/2 \leq \theta r \leq (\pi/Nr)$, respectively, wherein Nr is the number rotor poles and m is the number of phases of electric current. By supplying a sinusoidal, or substantially sinusoidal-like, driving waveform to the stator coils, torque becomes relatively constant and does not depend on the angular position of rotation of the rotor. Therefore, torque ripple is effectively decreased.

7 Claims, 5 Drawing Sheets

RELUCTANCE MOTORS

BACKGROUND OF INVENTION

A. Field of Invention

The present invention generally relates to high speed electric motors and more particularly to technology that decreases torque ripple in high speed reluctance motors.

B. Description of the Related Art

High speed motors are highly desirable for a variety of applications. For example, high speed motors can eliminate the need for a transmission mechanism to attain the necessary high operating speeds for machinery or vehicles. As a result, the machine or vehicle can operate more efficiently because power loss due to friction within the transmission mechanism is eliminated. In particular, such high speed motors are highly desirable for spinning machines used in the looming industry in which high operating speeds are necessary in order to achieve high product throughput.

High speed reluctance motors are well known and particularly suited for such applications. These electromagnetically driven motors are characterized by having a set of electromagnets (usually conducting coils wrapped around iron projections within the stator of the motor) that are energized and de-energized in a manner that rotates an iron rotor positioned in the center of the motor. Such known reluctance motors are generally driven with rectangular shaped waveform pulses.

In such reluctance motors, no torque ripple will occur in theory, if the stator coils are driven with precise rectangular waveforms. However, because electric current can not be changed instantaneously so as to generate perfectly rectangular waveforms, torque ripple is generated in known reluctance motors when the motor is rotated at a high speed.

Torque ripple results in vibrations and as torque ripple increases, known reluctance motors are subject to malfunction, the rotor can not rotate smoothly in unison with the phase changes of the stator coils. Therefore, the motor can not operate at the intended speed. In addition, the operating noise of the motor resulting from uneven revolution speed may be increased.

Various types of technologies have been proposed in order to decrease torque ripple in high speed reluctance motors. For example, in Japanese Laid-Open Patent Publication No. 8-322171, torque ripple is purportedly decreased by incorporating a skew structure on the rotor poles. In Japanese Laid-Open Patent Publication No. 8-126273, torque ripple is purportedly reduced by forming slits within each rotor pole and a pair of projections are formed at both sides of the tip of each rotor pole.

However, in the first reference, the process for forming the rotor requires a number of steel plates having difference cross-sections to be laminated and such manufacturing process is complicated. Additionally, in both systems, torque ripple is not actually suppressed as the revolution speed of the motor is further increased. Thus, a long-felt need exists to design a high speed reluctance motor in which torque ripple is substantially or completely suppressed at high operating speeds and is economical to produce. Such a reluctance motor would provide an inexpensive and reliable source of high speed power.

SUMMARY OF THE INVENTION

It is therefore an object of the present invention to provide an improved reluctance motor that overcomes, or at least substantially minimizes, the problems of the prior art.

Such problems of the prior art can be overcome by designing a reluctance motor in accordance with a defined relationship between the various parts of the motor. In its broadest aspect, the width or spread angle of the rotor poles is designed to be greater than the width or spread angle of the stator poles. Preferably, the relationship of the widths or spread angles of the rotor poles and the stator poles is within a preferred range. Techniques for calculating this preferred range are taught herein.

In the alternative, a reluctance motor is provided in which the stator coils are driven with sine waveforms, or waveforms substantially similar to sine waveforms. Because sine waveforms are relatively easy to generate in comparison to perfect rectangular waveforms, a reluctance motor with little or no torque ripple, and therefore little or no vibration, at high operating speeds can be achieved.

Optionally, both of these independent features may be combined to construct reluctance motors. Such motors have a defined relationship between the widths or spread angles of the stator poles and the rotor poles and are driven with sine, or substantially sinelike, waveforms. Such reluctance motors can be constructed using known techniques for manufacturing reluctance motors to achieve a low-cost, quiet and highly reliable high speed motor.

Other objects, features and advantages of the present invention will be readily understood after reading the following detailed description together with the accompanying drawings and the claims.

DETAILED DESCRIPTION OF THE INVENTION

Figure 1:
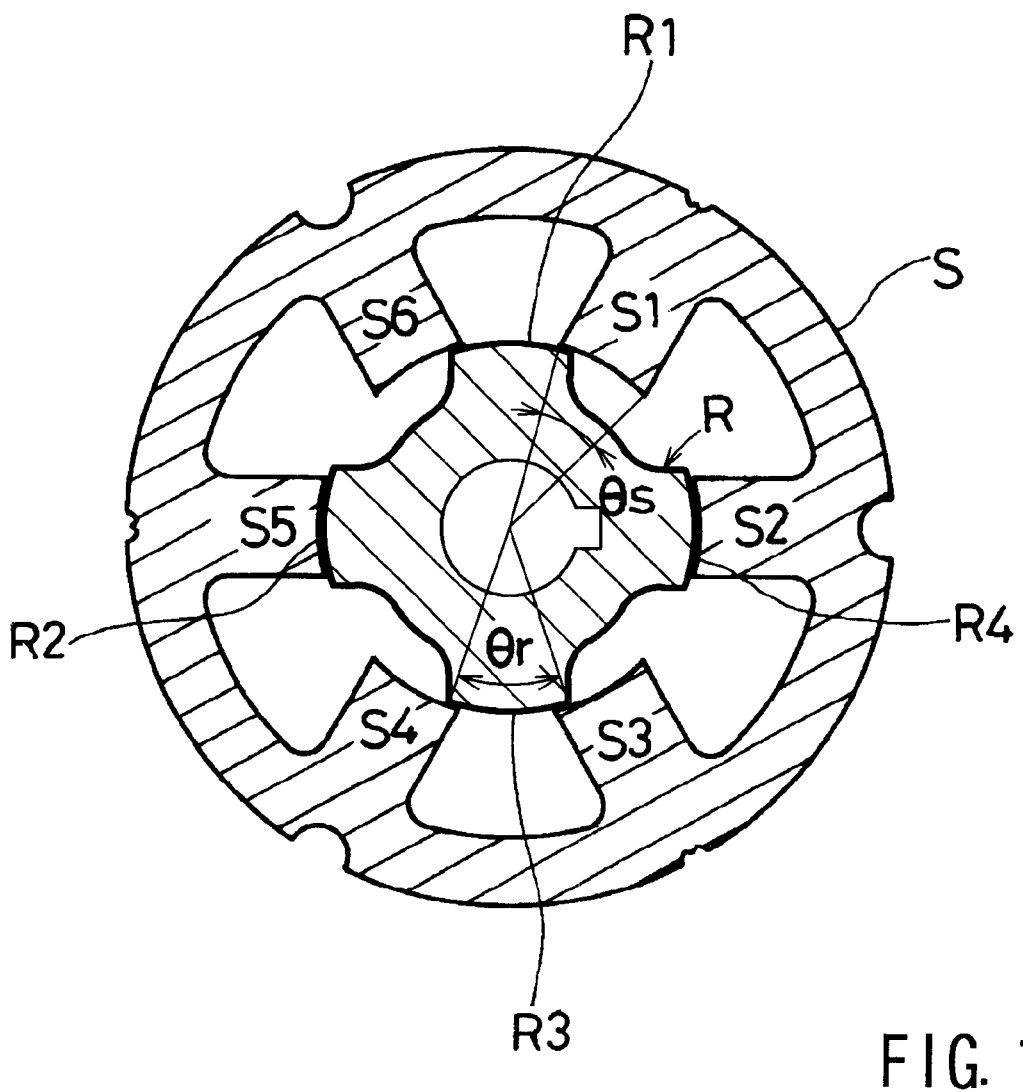
FIG. 1 is a view showing a cross-section of a motor designed according to a first representative embodiment.

Reluctance motors, as generally discussed herein, are intended to refer to motors having a substantially columnar rotor that rotates within a substantially cylindrical stator. Typically, at least two rotor poles project outwardly from the rotor at equal intervals around the circumference of the rotor. At least two stator poles project inwardly from the inner bore of the stator at equal intervals within the circumference of the stator. Stator coils are wound around each stator pole. The rotor is rotated by the electromagnetic influence caused by supplying electric current to the stator coils. The number of stator poles may not be necessarily be equal to the number of rotor poles.

In order to rotate reluctance motors at a high speed, the width of the stator poles and the rotor poles are preferably designed in an appropriate relationship. Generally, the rotor poles have been previously designed to have a width or spread angle that is similar or almost similar to the width or spread angles of the stator poles. In addition, known reluctance motors have been designed so that the difference in the magnitude of the inductance of the stator coil between (1) the state in which the rotor pole is directly opposite to the stator pole and (2) the state in which the rotor pole is positioned between two adjacent stator poles is maximized. Further, such known motors are driven with rectangular waveforms. However, the inability to generate perfect rectangular waveforms results in torque ripple and therefore vibrations and noise at high revolution speed.

Therefore, in a first aspect, reluctance motors driven with sinusoidal, or substantially sinusoidal-like, waveforms are taught. Such waveforms are simple to generate using known electric current generating means and permit reluctance motors to achieve high operating speeds with little or no torque ripple.

In a second aspect, reluctance motors having rotor poles that are larger in width than the stator poles are taught. Preferably, but optionally, reluctance motors of this design are driven with sinusoidal, or substantially sinusoidal-like, waveforms.

In a third aspect, reluctance motors are taught that have at least two stator poles equally, or substantially equally, spaced within a stator bore and at least two rotor poles equally, or substantially equally, spaced around the circumference of a rotor. The width of the stator poles preferably is defined by a first spread angle ($\theta s$) and the width of the rotor poles preferably is defined by a second spread angle ($\theta r$). These spread angles determine the width of the cylinder shaped stator and columnar shaped rotor poles, such that the spread angle is defined as the angle between a line drawn from the center of the rotor and one edge of a poles and a line drawn from the center of the rotor and the opposite edge of the same pole.

In a more preferred aspect of the present teachings, the first spread angle has a relation of $\theta s$ is equal or substantially equal to $2\pi/(m \cdot Nr)$ and the second spread angle has a relation of $(\theta s + \pi/Nr)/2 \leq \theta r \leq (\pi/Nr)$. Nr is the number of rotor poles, and m is the number of phases of electric current that will be used to drive the motor (the same driven waveform may be phase shifted "m" times as necessary and desirable to drive the stator coils). The lower limit for the second spread angle can also be expressed as $(2\pi/(m \cdot Nr) + \pi/Nr)/2$. Although the spread angles are defined in terms of radians in this relationship, those skilled in the art will recognize that any conventional geometric relationship can be utilized.

By adjusting the dimensions of the various components of the motor in accordance with these relationships, the inductance of the stator coil, measured while rotating the rotor with respect to the stator, has an approximately sinusoidal waveform. Therefore, when substantially sinusoidal current is supplied to the stator coil, the torque for rotating the rotor becomes substantially constant regardless of the angular position of rotor rotation. As a result, torque ripple can be effectively decreased, even when the motor is operated at high speeds.

Those skilled in the art will recognize that a variety of waveforms similar to a sinusoidal wave can be utilized with the present teachings. For example, the driving waveform supplied to the stator coils may be a reversed or absolute sine wave in which the negative values of alternating sinusoidal current are converted to positive values. Naturally, because cosine waveforms have the same shape as sine waveforms, such waveforms are included within the present teachings. Generally, waveforms having a gradually increasing and decreasing shape are particularly preferred.

When the dimensions of the various aspects of the motor are adjusted in accordance with the present teachings, the rotor can be constructed according to simple shapes and designs. Thus, while the rotor can be designed using known shapes for reducing torque ripple, such as skew shapes, slits and/or other projections, such complicated designs are not necessary to reduce torque ripple. As a result, the manufacture and production of motors using the present teachings can be dramatically simplified.

Each of the additional features and method steps disclosed above and below may be utilized separately or in conjunction with other features and method steps to provide improved motors and methods for making such motors. Representative examples of the present invention, which examples utilize many of these additional features and method steps in conjunction, will now be described in detail with reference to the drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative and preferred embodiments of the invention.

EXAMPLE 1

A reluctance motor according to a first representative embodiment includes a substantially columnar shaped rotor rotating within a substantially cylindrically shaped stator bore. At least two stator poles project inwardly at an equal circumferential interval from an inner bore of the stator and at least two rotor poles project outwardly at an equal circumferential interval from an outer circumference of the rotor. A stator coil is wound around each stator pole, and the rotor is rotated by supplying at least two phases of alternating electric current to the stator coils.

Preferably, the first spread angle of the stator poles are designed according to the relationship of $\theta s$ is equal or substantially equal to $2\pi/(m \cdot Nr)$ and the second spread angle of the rotor poles is designed within the range of $(\theta s + \pi/Nr)/2 \leq \theta r \leq (\pi/Nr)$. The spread angles determine the width the stator and rotor poles by forming a triangle with the center of the rotor and the two outer edges of either the stator or the rotor pole, respectively. The width of the stator or rotor pole is the base of the triangle formed in this manner. Electric current having sinusoidal waveform or converted sinusoidal waveform is preferably supplied to the stator coils to rotate the rotor.

FIG. 1 shows a cross-sectional view of a rotor R and a stator S of a reluctance motor according to this representative embodiment. Rotor R preferably has a substantially columnar shape and the cross section shown in FIG. 1 is substantially uniform along the entire length in an axial direction. A shaft (not shown) is fixed to the inner bore of the rotor R and both ends of the shaft are supported by bearings (not shown). In this example, rotor R has four rotor poles R1 through R4 projecting outwardly from the outer circumference of the columnar rotor R, and the four rotor poles R1 through R4 are disposed at equal intervals around the circumference of the rotor. Naturally, the designer is free to choose the number of rotor poles, as well as the shape of the rotor poles, according to the teachings provided herein.

Stator S also preferably has a substantially cylindrical shape and surrounds or encloses rotor R. Preferably, stator S has six stator poles S1 through S6 projecting inwardly from the inner bore, and the six stator poles S1 through S6 are disposed at equal intervals within the inner circumference of the stator S. Stator coils C1 through C6 (FIG. 2) are wound around stator poles S1 through S6, respectively. In FIG. 1, stator coils have been omitted to simplify the drawing, although stator coils are intended to be included in the design of the first representative embodiment.

Figure 2:
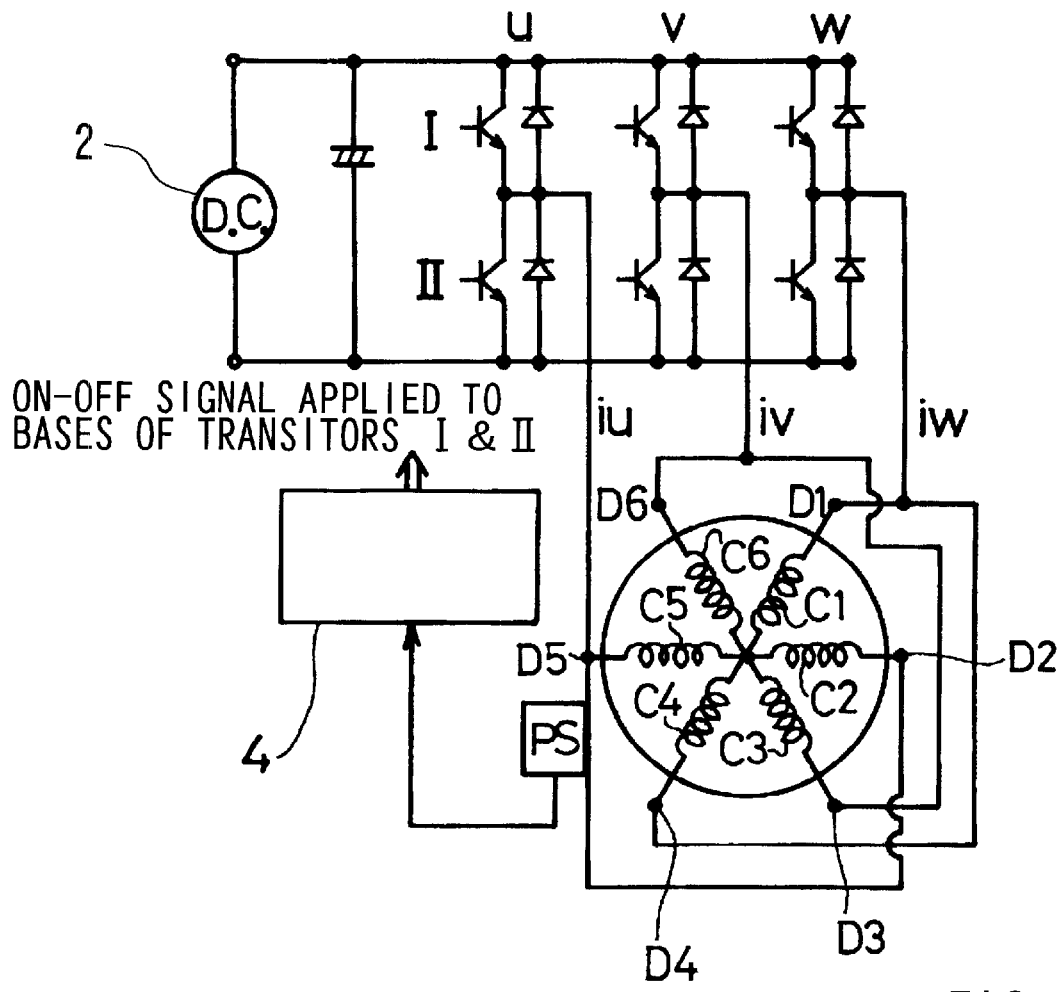
FIG. 2 is a view showing a representative drive circuit for a motor designed according to the first representative embodiment.

As shown in FIG. 2, the six stator coils C1 through C6 are preferably composed of three sets of paired coils (C1/C4, C2/C5 and C3/C6). Each pair of coils preferably is constructed so that the two coils are opposite of each other. Preferably, the three sets of coils are driven with three different phases of electric current Iu, Iv, and Iw. Preferably, the same waveform is used for each set of paired coils, but the phase of the waveform is offset according to the teachings herein for each set of paired coils. Again, preferably the driving waveform is sinusoidal or substantially sinusoidal. In the first representative example, the phases of sinusoidal currents Iu, Iv, and Iw preferably are shifted 120 degrees from each other.

FIG. 2 shows a representative circuit for generating the driving waveforms that will be supplied to the stator coils. The current from a direct current source 2 is branched into three sets of waveform generating circuits u, v and w. Two transistors (I, II) may be utilized to form the waveform generating circuit in each branch. The six transistors may be PWM (pulse width modulation) controlled by a controller 4, wherein each phase (branch current) Iu, Iv, and Iw drives each stator coil pair (C1/C4, C2/C5 and C3/C6, respectively). The driving waveform is generally a sinusoidal current and each pair of stator coils is driven with a substantially sinusoidal current that is phase shifted 120 degrees from each other.

Therefore, according to the reluctance motor illustrated in FIG. 1, the number of the stator poles is 6, the number of the rotor poles is 4, and the number of phases of electric current to be supplied to the motor is 3. As shown in FIG. 1, the first spread angle ($\theta$s) of the stator poles is viewed from the axis of the center of the rotor and is set to be approximately $2\pi/(m \cdot Nr) = \pi/6$ radians or 30°. Furthermore, the second spread angle ($\theta$r) of the rotor poles is set to be equal to or less than $\pi/Nr = \pi/4$ radians or 45° and greater than or equal to $(\pi/6 + \pi/4)/2 = 5\pi/24$ or 37.5°. Thus, as shown by this relation, the second spread angle will be greater than the first spread angle.

If the dimensions of the various aspects of the motor are set in the above mentioned range, the inductance of each stator coil, for example, in the case of stator coil C1 illustrated in FIG. 2, measured while rotating the rotor R with respect to the stator S, changes substantially as a sine wave in unison with the rotation angle of the rotor R. The inductance is measured between the ends D1 and M of the stator coil C1.

The advantages of the present teachings will be further explained with reference to FIG. 3. FIG. 3(A) shows a linear profile of the top edge of one stator pole. For convenience of description, the round interior of the stator bore and the round exterior of the rotor are both represented as flat surfaces. As noted above, each stator pole has a spread angle ($\theta$s) approximately equal to $2\pi/(m \cdot Nr)$. In order to provide uniform intervals between adjacent stator poles, the pitch or the spread angle between the centers of two adjacent stator poles is $2\pi/Ns$, wherein Ns is the number of stator poles.

FIG. 3(B) illustrates a rotor profile of a known design, in which the spread angle of the rotor pole has been determined so that the difference between the inductance of the stator coil which is measured when the rotor pole is opposed facing to the stator pole, and the inductance of the stator coil which is measured when the rotor pole is positioned at the middle point between two adjacent stator poles is maximized. For this reason, the spread angle ($\theta$r) of the rotor pole used in the prior art was set to be equal to or slightly greater (usually by 1 to 2 degrees) than the spread angle ($\theta$s) of the stator pole. As a result, the inductance can greatly fluctuate and a large torque to rotate the rotor can be generated. The pitch or the spread angle between two adjacent rotor poles is $2\pi/Nr$ in the known designs.

However, because the angular range of rotor rotation in which the inductance is almost maximized is not coincident with the angular range of rotor rotation in which the inductance is almost minimized for such known designs, the fluctuation curve of the inductance obtained with respect to the rotating angle of the rotor greatly deviates from a sinusoidal wave. In an attempt to overcome this problem, the stator coils are driven with rectangular driving waveforms to generate the torque that rotates the rotor. Therefore, at low speeds, the fact that the fluctuation curve of the inductance of the stator coil greatly deviates from a sinusoidal wave does not cause any serious torque ripple problems. That is, if the supplying current has a rectangular waveform, no significant torque ripple is generated.

However, as the rotation speed of the motor is increased, the frequency of the rectangular driving waveforms must be increased and it becomes exceedingly difficult to continue to generate appropriate rectangular waveforms at such high frequencies. Instead, the driving waveforms are known to degenerate and have sloped edges. As a result, power is supplied to the stator coils at improper times, thereby generating torque ripple.

On the other hand, the basic driving concept of the prior art has been drastically changed by the present teachings. Instead, the angular range of rotor rotation in which the inductance is almost maximized is made approximately coincident with the angular range of rotor rotation in which the inductance is almost minimized, and the fluctuation curve of the inductance obtained with respect to the rotation angle of the rotor approximates a sinusoidal wave. By supplying sinusoidal current to the stator coils and preferably setting the dimensions of the various aspects of the motor in accordance with the above mentioned relationships, the driving torque generated between the rotor and stator becomes substantially constant regardless of the rotation angle of the rotor. This principal concept will be further developed below.

Figure 3:
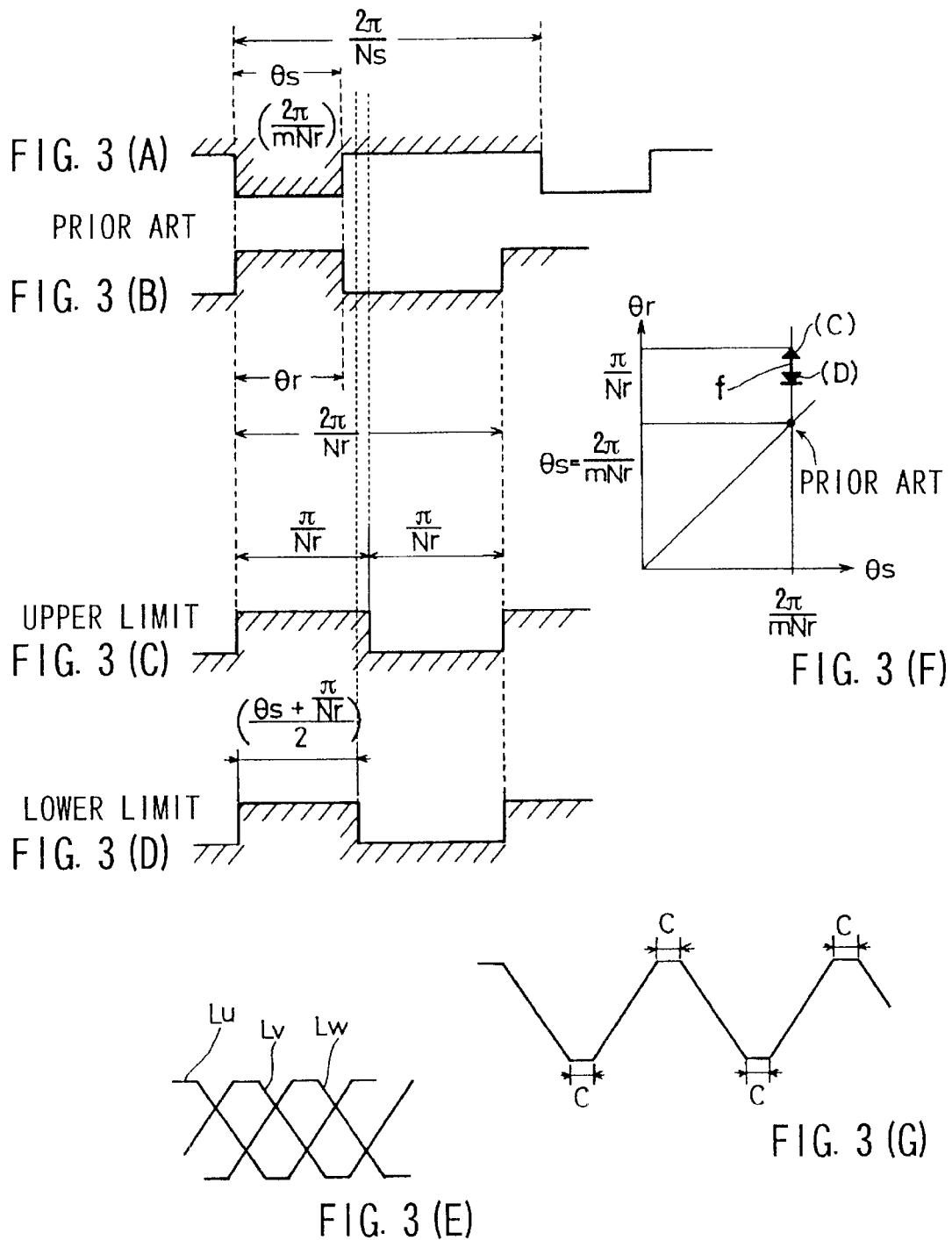
FIGS. 3(A) through (G) are views depicting the influence of the spread angle of a rotor pole on the inductance waveform of the stator coil.

FIG. 3 (C) shows a profile of a rotor pole in which the spread angle ($\theta$r) is set at upper limit of the equation noted above ($\pi/Nr$). In this case, the spread angle between two adjacent rotor poles also becomes equal to $\pi/Nr$. In such a case, the angular range of rotor rotation in which the rotor pole is opposite to the stator pole (and therefore the inductance of the stator coil is almost maximized) is substantially coincident with the angular range of rotor rotation in which the interval between two adjacent rotor poles opposite to the stator pole and the inductance of the stator coil is almost minimized. Thus, the fluctuation curve of the inductance with respect to the rotation angle of the rotor approximates a sinusoidal wave, which waveform is shown for example in FIG. 3(G).

As the rotor pole rotates close to the stator pole, a force is generated due to a magnetic flux diagonally oriented from the stator pole toward the rotor pole before the rotor pole is completely opposite to the stator pole. As a result of this diagonally oriented magnetic flux, even though the spread angle (θr) of the rotor pole is slightly smaller than the spread angle of the interval between two adjacent rotor poles, the angular range of rotor rotation in which the inductance of the stator coil is almost maximized becomes substantially coincident with the angular range of rotor rotation in which the inductance of the stator coil is almost minimized. Experimental results have confirmed that if the spread angle (θr) of the rotor pole is more than (θs+π/Nr)/2, the inductance curve approximates a sinusoidal wave.

FIG. 3 (F) shows a relationship of a preferred aspect of the present teachings to the prior art. According to known reluctance motors, the spread angle of the rotor poles and the spread angle of the stator poles was set to be equal to each other. To the contrary, according to the preferred aspects of the present teachings, the spread angle (θr) of the rotor pole is made greater than the spread angle (θs) of the stator pole. As discussed above, the lower limit of the spread angle (θr) of the rotor pole is (θs+π/Nr)/2 (point D in FIG. 3(F)) and the upper limit is π/Nr (point C in FIG. 3(F)). Thus, the spread angle (θr) of the rotor pole is most preferably chosen to be in the range indicated by the arrow "f" in FIG. 3(F).

To actually determine the preferred spread angle (θr) of the rotor pole for a given reluctance motor, preferably arithmetical calculation software developed by Professor Kawase at Cifu University in Cifu, Japan is utilized. The magnetic characteristics between the rotor and stator can be modeled in order to determine an appropriate spread angle (θr) that satisfies the required performance of the motor. At this time, since the lower and upper limits of the spread angle of the rotor pole are known in advance, the arithmetical calculation can be performed in a short time without difficulty.

FIG.3 (E) indicates the angular position of rotor rotation at its abscissa and indicates inductance curves, in which the inductance of the respective three phases of stator coils is plotted, at its ordinate. If the spread angle (θr) of the rotor pole is set to be within the range of (θs+π/Nr)/2 and π/Nr, the angular range of rotor rotation in which the inductance is maximized becomes almost equal to the angular range of rotor rotation in which the inductance is minimized. In the respective phases, the inductance waveform is approximately a sinusoidal wave. Again, the phases of three sine waves are shifted 120° with respect to each other.

The inductance waveforms for the respective phases can be expressed by the following equations:

$$Lu=L0+L1\cdot\cos(Nr\cdot\theta m)+\Sigma kn\cdot\cos(n\cdot Nr\cdot\theta m),$$

$$Lv=L0+L1\cdot\cos(Nr\cdot\theta m+2\pi/3)+\Sigma kn\cdot\cos(n\cdot Nr\cdot\theta m+2\pi/3), \text{ and}$$

$$Lw=L0+L1\cdot\cos(Nr\cdot\theta m-2\pi/3)+\Sigma kn\cdot\cos(n\cdot Nr\cdot\theta m-2\pi/3).$$

Accordingly, the driving current supplied during the respective phases can be expressed by the following equations:

$$iu=\sqrt{2}\cdot I0\cdot\cos(\omega t+\alpha),$$

$$iv=\sqrt{2}\cdot I0\cdot\cos(\omega t+\alpha-2\pi/3), \text{ and}$$

$$iw=\sqrt{2}\cdot I0\cdot\cos(\omega t+\alpha+2\pi/3),$$

wherein α is a phase of electric current with respect to the rotation angle of the rotor, θm is a rotation angle of the rotor, Σ represents a summation function with respect to n=1,2,3~, and k1, k2, k3~ are harmonic coefficients.

In this case, the torque T generated to rotate the rotor is calculated by the following equation:

$$T=(3/4)\cdot L1\cdot Nr\cdot I0^2\cdot\sin(2\omega t-Nr\cdot\theta m+2\alpha) +\Sigma(3/4)\cdot kn\cdot Nr\cdot I0^2\cdot\sin(2\omega t-n\cdot Nr\cdot\theta m+2\alpha).$$

In a synchronization motor, a relationship of $2\omega t=Nr\cdot\theta m$ is generally adopted. Under such conditions, the first term in the above mentioned equation is a constant. That is, the torque in the first term does not depend upon the rotation angle θm of the rotor. Furthermore, because the spread angle θr of the rotor is set to be greater than (θs+π/Nr)/2 but less than π/Nr and the inductance waveform closely approximates a sine wave, high-order harmonic coefficients kn are small. Therefore, the value of the second term of the above mentioned equation for the torque T is small. As a result of the present design, torque pulsation or ripple is therefore minimized.

According to this equation for torque T, the square of the electric current determines the torque T. Therefore the electric current waveform may be an absolute sine waveform (or a closely related waveform thereto) in which the negative values of the sine waveform are changed to positive values. Throughout this specification, such a waveform is referred to as an absolute sine wave or a converted sine wave. When electric current is supplied to the motor as a converted or absolute wave function, the polarity of the current does not change, and a current regulation circuit can simply be constructed.

EXAMPLE 2

In the first representative embodiment, a reluctance motor was constructed having 6 stator poles, 4 rotor poles, and 3 phases of electric current to be supplied to the motor. However, the present teachings encompass a variety of relationships between the number of stator poles, the rotor poles and phases of electric current and the reader can select such parameters according to particular design preferences.

Figure 4:
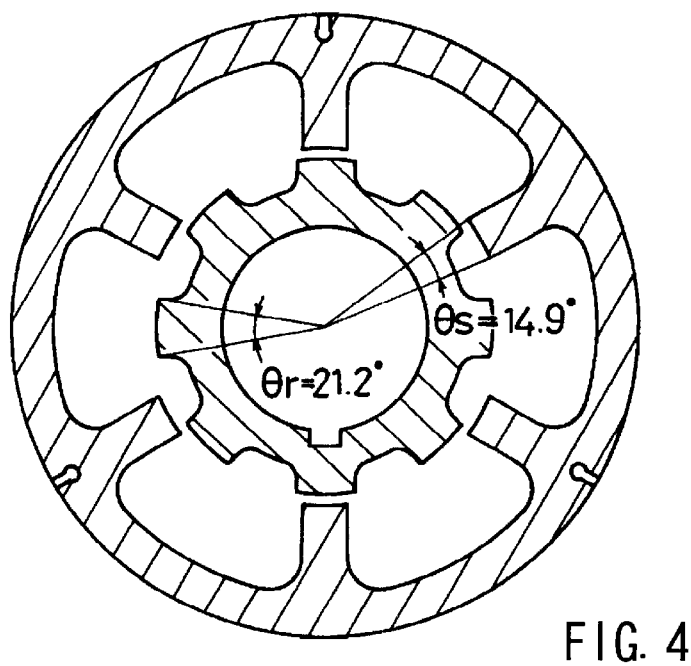
FIG. 4 is a cross-sectional view of a motor designed according to a second representative embodiment.

For example, FIG.4 provides a representative example in which the number of the stator poles is 6, the number of the rotor poles is 8, and the number of phases of electric current is 3. In this second representative example, the spread angle (θs) of the stator pole is calculated to be equal to or substantially equal to 2/(m·Nr)=15°. Preferably, according to experimental results, first spread angle is set to be about 14.9°. Furthermore, based upon experimental results, the spread angle (θr) of the rotor pole is set to be about 21.2°, which is less than π/Nr=180°/8=22.5°, and more than the average value (in this case 18.8°) of θs (in this case, 15°) and π/Nr (in this case, 22.5°). By setting the dimensional factors within the above mentioned range, the inductance waveform closely approximates a sinusoidal wave, and the harmonic coefficients of the inductance waveform are low. Therefore, the torque ripple is substantially decreased, because the torque T for rotating the rotor becomes constant or uniform and does not depend on the rotation angle of the rotor.

EXAMPLE 3

Figure 5:
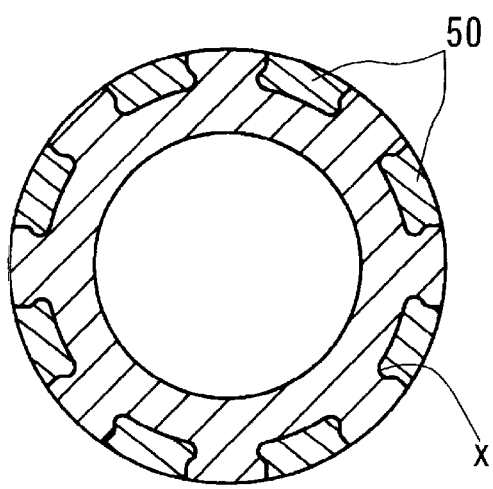
FIGS. 5(A) and (B) are cross-sectional views of a motor designed according to a third representative embodiment.
Figure 5:
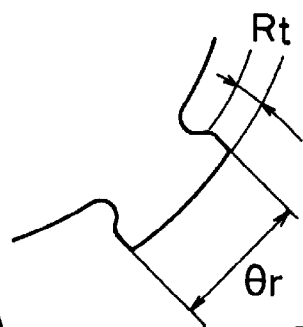

FIG.5 shows an example in which the outer circumference of the rotor is made smooth by filling resin 50 into concave portions between the rotor poles protruding from the outer circumference of the rotor. If the outer circumference of the rotor has a smooth finish, noise from rotor rotation (resulting from the edges of the rotor disturbing the air) is suppressed even when the rotor is rotated at a high speed. Thus, this filling technique can be optionally utilized to reduce noise. In addition, the mechanical strength of the rotor will be increased, and the rotor resists damage even when rotated at a high speed.

In this structure, recesses x may be advantageously provided along the sides of the rotor poles in order to prevent the resin 50 from dislodging due to centrifugal force. Furthermore, as shown in FIG. 5(B), if the thickness Rt of the top edge of the rotor pole, which has a width that satisfies the relationship of $(\theta s+\pi/Nr)/2 \leq \theta r \leq (\pi/Nr)$, is made greater than two or more times than the gap formed between the stator poles and rotor poles, almost no influence results from the above mentioned recesses x. Again, the inductance waveform approximates a sinusoidal wave and causes torque ripple to be decreased.

If the dimensions of the motor are adjusted in the range disclosed herein, torque ripple can decreased. In addition, techniques are disclosed to produce a motor that continuously rotates silently at a fixed speed. Furthermore, the durability of the motor can be greatly improved. Therefore, a sensor to detect the angular position of the rotor, which sensor was included in known designs, may be eliminated.

Figure 6:
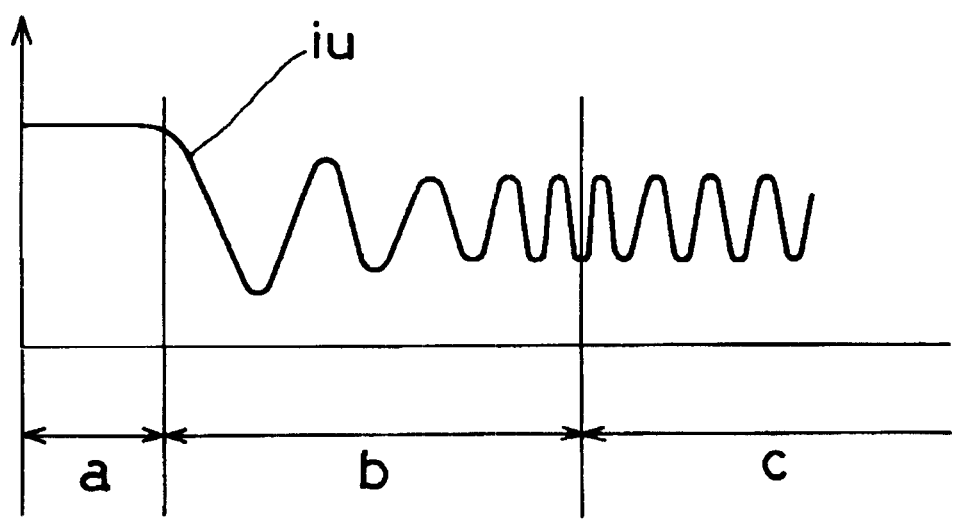
FIG. 6 shows a representative example of electric current that can be supplied to the motor, when the motor is driven without a sensor.

If electric current as shown in FIG. 6 is supplied to the motor, it is possible to almost completely prevent any malfunction of the motor, and no sensor will be required for actual use. Although only one phase of electric current is shown in FIG. 6 to simplify the illustration, the other phases are shifted 120 degrees with respect to the shown curve. By continuously supplying a fixed level of electric current during period "a," the angular position of the rotor is initialized at a constant angle. During period "b," the motor rotation speed is gradually increased. Period "c" indicates the state in which the motor rotates at a constant high speed and the frequency of electric current is maintained at a constant rate. Thus, by supplying electric current to the motor according to the function of FIG. 6, torque ripple can be decreased, malfunctions of the motor are significantly reduced, and the motor can rotate smoothly and quietly without a sensor for detecting the angular position of the rotor. Therefore, a sensorless reluctance motor can be realized.

Furthermore, since the motor is driven by using sinusoidal current, no special power source equipment is needed, and the range of application for the motor can remarkably be broadened.

What is claimed is:

1. A motor, comprising:

at least two stator poles projecting at equal, or substantially equal, intervals from an inner circumference of a substantially cylindrical stator;

stator coils wound around each of the stator poles, the stator coils capable of conducting current having at least two phases;

at least two rotor poles projecting at equal or substantially equal, intervals from an outer circumference of a rotor, the rotor being influenced by magnetic flux generated by conducting current through the stator coils, the cross section of the rotor and rotor poles being uniform or substantially uniform along the length in an axial direction, wherein the stator poles have a first spread angle in relation to the center of the rotor and the rotor poles have a second spread angle in relation to the center of the rotor, the first spread angle is approximately equal to $2\pi/(m \cdot N_r)$ and the second spread angle is the range of about $(2\pi/(m \cdot N_r)+\pi/N_r)/2 \leq \theta \leq (\pi N_r)$, wherein m is the number of current phases and $N_r$ is the number of rotor poles; and the rotor is rotated by driving each of the stator coils with sinusoidal, or substantially sinusoidal, waveforms.

2. A motor as in claim 1, wherein the respective phases of electric current supplied to the stator coils have an absolute sinusoidal waveform.

3. A motor as in claim 1, wherein the outer circumference of the rotor is made smooth by filling in concave portions between rotor poles.

4. A motor as in claim 1, wherein the respective phases of electric current supplied to the stator coils has an absolute sinusoidal waveform and the outer circumference of the rotor is made smooth by filling in concave portions between rotor poles.

5. A motor as in claim 1, wherein opposing pairs of stator coils are driven with the same waveform.

6. A motor as in claim 5, wherein the motor comprises six stator poles and six stator coils and m equals 3, whereby three pairs of opposing stator coils are driven with three offset waveforms, respectively.

7. A motor as in claim 6, wherein the number of rotor poles equals 4.

* * * * *

UNITED STATES PATENT AND TRADEMARK OFFICE
CERTIFICATE OF CORRECTION

PATENT NO.      : 6,351,053 B1
DATED           : February 26, 2002
INVENTOR(S)     : Minoshima et al.

It is certified that error appears in the above-identified patent and that said Letters Patent is hereby corrected as shown below:

Title page,
Item [57], ABSTRACT,
Line 4, please delete "that" and insert therefor -- than --;
Line 8, please delete "number rotor" and insert therefor -- number of rotor --.

Column 1,
Line 17, please delete "spinning" and insert therefor -- optimizing --;

Column 2,
Line 21, please delete "sinelike"" and insert therefor -- sine-like --;

Column 7,
Line 27, please delete "Cifu University in Cifu," and insert therefor -- Gifu University in Gifu, --;

Column 8,
Line 44, please delete "2/ (m·Nr)=15º." and insert therefor -- $2\pi$/ (m·Nr)=15º. --.

Signed and Sealed this

Twenty-fourth Day of September, 2002

*Attest:*

JAMES E. ROGAN
*Attesting Officer*          *Director of the United States Patent and Trademark Office*